(12) United States Patent
Marcu et al.

(10) Patent No.: US 8,203,512 B2
(45) Date of Patent: Jun. 19, 2012

(54) SUBTRACTIVE DISPLAY

(75) Inventors: Gabriel G. Marcu, San Jose, CA (US);
Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 12/554,768

(22) Filed: Sep. 4, 2009

(65) Prior Publication Data

US 2010/0090930 A1    Apr. 15, 2010

Related U.S. Application Data

(63) Continuation of application No. 11/179,311, filed on Jul. 12, 2005, now Pat. No. 7,586,472.

(51) Int. Cl.
*G09G 3/34* (2006.01)
(52) U.S. Cl. ............... 345/84; 345/32; 345/72; 345/690
(58) Field of Classification Search .................... 345/32, 345/84, 589, 690, 72; 349/106, 108; 250/208.1; 353/31, 84; 359/303, 634
See application file for complete search history.

(56) References Cited

U.S. PATENT DOCUMENTS

| 5,237,437 | A | 8/1993 | Rupp | 349/107 |
| 6,888,529 | B2 | 5/2005 | Bruning et al. | 345/102 |
| 7,586,472 | B2 * | 9/2009 | Marcu et al. | 345/84 |

FOREIGN PATENT DOCUMENTS

JP    11-231301    8/1999

OTHER PUBLICATIONS

Jason C. Heikenfeld and Andrew J. Steckl, Liquid Light, Nov. 2004, Information Display, pp. 26-61.

* cited by examiner

*Primary Examiner* — Abbas Abdulselam
(74) *Attorney, Agent, or Firm* — Fish & Richardson P.C.

(57) ABSTRACT

A display and techniques for displaying information involve the use of pixel-generating elements that include a light conduit and multiple adjustable light absorbing filters. The light conduit allows light from a light source to pass from a first side to a second side of the pixel-generating element. A first adjustable light absorbing filter adjustably absorbs a first set of visible light wavelengths from light passing through the light conduit to produce a first filtered light. A second adjustable light absorbing filter adjustably absorbs a second, different set of visible light wavelengths from the first filtered light. Each adjustable light absorbing filter is adjustable to a substantially transparent state, and the pixel-generating element generates a viewable pixel having a color adjustable between substantially a color of the light source and a color of the light source as modified by one or both of the adjustable light absorbing filters.

22 Claims, 4 Drawing Sheets

SUBTRACTIVE DISPLAY

TECHNICAL FIELD

This description relates to display devices, and more particularly to subtractive color mixing displays.

CLAIM OF PRIORITY

This application claims priority under 35 USC §119(e) to U.S. patent application Ser. No. 11/179,311, filed on Jul. 12, 2005, the entire contents of which are hereby incorporated by reference.

BACKGROUND

Color display devices, such as computer monitors and television sets, typically include thousands of individual pixels. A pixel is a discrete picture element that, for example, can generate a range of colors at a particular location on a display screen. Pixels are typically arranged in an array of columns and rows. Collectively, the pixels can be used to form an image. For example, each pixel corresponds to a dot, and a combination of thousands of dots having various different colors and intensities produces a viewable image on a display screen.

Conventional display devices use an additive color mixing process. Using additive color mixing, each pixel on a display screen or projector is produced using an RGB (red-green-blue) representation. Different proportional combinations of red, green, and blue components can be used to produce a wide range of colors. In an RGB display, each pixel includes three adjacent sub-pixels—one red sub-pixel, one green sub-pixel, and one blue sub-pixel. A single pixel can be generated from the combined light of the three sub-pixels, and, by controlling the intensity of each sub-pixel, the pixel can be adjusted to produce a wide range of visible colors. Thus, each pixel is an additive mixture of varying proportions of the three primary colors, which are added to an effectively black background.

Printers on the other hand generally produce colors through a subtractive color mixing principle. In particular, varying amounts of different tinted inks are applied to a sheet of white paper in layers. A typical color printer, for example, includes cyan, magenta, yellow, and black (CMYK) inks. Each layer subtracts some of the light from the white background, and the combination of the layers results in light of a particular color. By using different proportional amounts of the tinted inks in the layers, a wide range of visible colors can be produced. Thus, colors are produced on a page by subtracting selected proportions of different wavelengths of light from an effectively white background.

Because of the different mixing principles used in additive RGB display devices and subtractive CMYK printers, it is necessary to perform conversions between parameters of color mixing models associated with such display devices and printers. For example, an RGB model for a particular display device uses a corresponding set of parameters to define an intensity of each RGB sub-pixel to produce a specific color. A CMYK model for a particular printer uses a similar set of parameters to define an amount of each CMYK ink to produce a specific color. To print an image that is represented on a display screen, a conversion between the parameters of the two models is necessary.

SUMMARY

A CMYK display device can be produced using sets of overlapping light filters. Each light filter can absorb light of a particular color (i.e., a certain range of the visible spectrum, leaving the remaining part of the visible spectrum virtually unaltered). The filters can be adjusted to absorb or subtract varying amounts of the particular color of light. The filters can be switched between a state of absorbing colored light or a state of transparency, or any arbitrary intermediate state between these. As a result, the light passing through each set of overlapping light filters can be selectively adjusted to produce a wide range of colors.

In one general aspect, a display includes multiple pixel-generating elements. Each pixel-generating element includes a light conduit adapted to allow light from a light source to pass from a first side to a second side of the pixel-generating element. A first adjustable light absorbing filter adjustably absorbs a first set of visible light wavelengths from light passing through the light conduit to produce a first filtered light. A second adjustable light absorbing filter adjustably absorbs a second set of visible light wavelengths from the first filtered light. The second set of visible light wavelengths including one or more wavelengths that differ from the first set of visible light wavelengths. Each of the first adjustable light absorbing filter and the second adjustable light absorbing filter are adjustable to a substantially transparent state, and the pixel-generating element generates a viewable pixel having a color adjustable between substantially a color of the light source and a color corresponding to the light source as modified by the first adjustable light absorbing filter and/or the second adjustable light absorbing filter.

Implementations can include one or more of the following features. Each pixel-generating element includes one or more additional adjustable light absorbing filters, and each pixel-generating element produces a substantial portion of a visible spectrum. The light source generates a substantially white light. The pixel-generating elements effectively produce substantially all viewable pixels within a display area and are adapted to produce substantially identical ranges of viewable colors. Each pixel-generating element includes a mask to prevent passage of filtered light from an adjustable light absorbing filter in a substantially transparent state. The first adjustable light absorbing filter and the second adjustable light absorbing filter are each adjusted by altering a layer of light absorbing fluid. The first adjustable light absorbing filter and the second adjustable light absorbing filter are each an electro-wetting light valve. The light source produces light having a set of source wavelengths that includes the first set of visible light wavelengths and the second set of visible light wavelengths. The display is a reflective display and the light source is an ambient lighting. The display is a transmissive display and the light source is a backlight.

In another general aspect, viewable information on a display is produced by providing a light source operable to illuminate multiple pixels. The light source emits light having a set of visible light wavelengths. Light from the light source is dynamically filtered using a series of adjustably subtractive light filters. Each adjustably subtractive light filter adjustably absorbs a corresponding subset of visible light wavelengths from the light source, and the series of adjustably subtractive light filters selectively adjust between providing a substantially transparent passage of the set of visible light wavelengths and absorbing at least a portion of a subset of the set of visible light wavelengths. The selectively adjusted light wavelengths are presented for viewing by an observer without substantially altering the light wavelengths emitted by the series of adjustably subtractive light filters.

Implementations can include one or more of the following features. The subset of the set of visible light wavelengths overlaps two or more of the corresponding subsets of visible light wavelengths. A voltage is applied to each adjustably subtractive light filter to adjust a degree of filtering of the corresponding subset of visible light wavelengths. Each adjustably subtractive light filter is adjustable independent of one or more other adjustably subtractive light filters.

In another general aspect, a display includes multiple pixel-generating elements, each of which includes a light conduit that allows passage of light from a light source and at least three adjustable light absorbing filters arranged in series to sequentially and selectively filter wavelengths of light produced by the light source. Each of the adjustable light absorbing filters absorbs a different set of visible light wavelengths.

Implementations can include one or more of the following features. The display includes two or more electro-wetting layers, each of which includes one or more layers of tinted substances that adjustably interferes with passage of a set of visible light wavelengths. Each electro-wetting layer further includes a hydrophobic layer and a layer of water that adjustably displaces one or more layers of the tinted substances based on a voltage differential between the layer of water and another layer. The display includes two or more electro-wetting layers. Each electro-wetting layer includes a first hydrophobic layer and a first layer of tinted substance adjacent to the first hydrophobic layer. The first layer of tinted substance adjustably interferes with passage of a first set of visible light wavelengths. The display also includes a second hydrophobic layer and a second layer of tinted substance adjacent to the second hydrophobic layer. The second layer of tinted substance adjustably interferes with passage of a second set of visible light wavelengths. A layer of water situated between the first layer of tinted substance and the second layer of tinted substance adjustably displaces one or more layers of tinted substance based on a voltage differential between the layer of water and another layer. At least three of the layers of tinted substance absorb substantially different sets of visible light wavelengths. At least five of the layers of tinted substance each absorb a particular set of visible light wavelengths and allow passage of a substantial set of other visible light wavelengths. Three of the adjustable light absorbing filters selectively filter wavelengths of light corresponding to cyan, magenta, and yellow. Each pixel-generating element includes a fourth adjustable light absorbing filter that selectively filters an additional set of wavelengths of light other than the wavelengths of light selectively filtered by the three adjustable light absorbing filters. The additional set of wavelengths of light expand a color gamut relative to the three adjustable light absorbing filters. Each pixel-generating element includes an adjustable light absorbing filter that selectively filters substantially all wavelengths of light produced by the light source.

In yet another general aspect, viewable information on a display is produced by identifying a range of colors to be produced by a display device and providing three or more adjustable subtractive light filters for each pixel element to be included in a display. Each of the adjustable subtractive light filters subtract a different range of visible light wavelengths. The adjustable subtractive light filters for each pixel element are arranged in series and a light source for illuminating the pixels in the display is provided. The adjustable subtractive light filters are controlled to enable each pixel element to selectively produce substantially any color within the identified range of colors using selective and serial subtractive adjustments to light from the light source.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
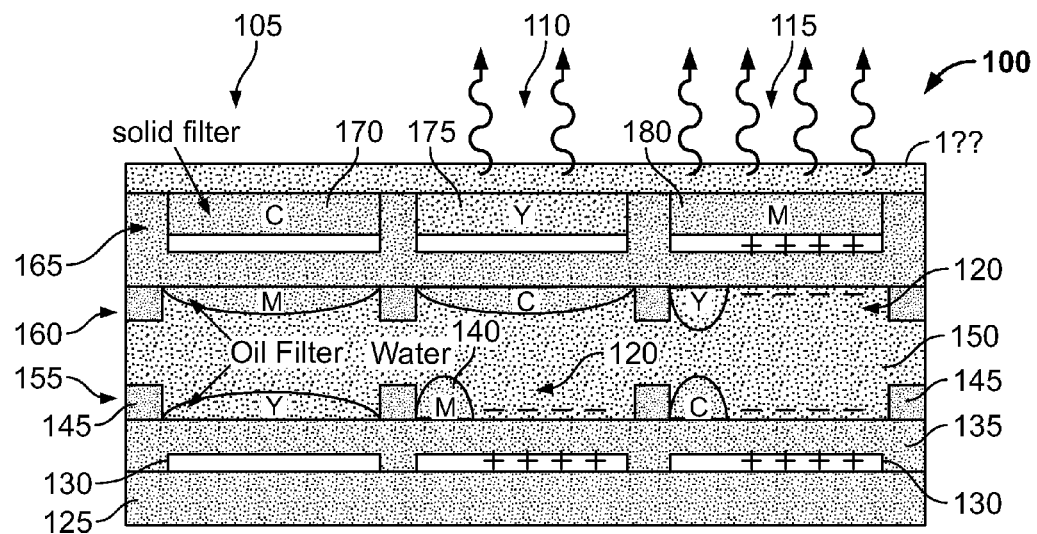
FIG. 1 is an illustrative diagram of a prior art pixel-generating structure.

FIG. 1 is an illustrative diagram of a prior art pixel-generating structure 100. The pixel-generating structure 100 includes three sub-pixels 105, 110, and 115 and adjusts the light emitted by each sub-pixel 105, 110, or 115 using an electro-wetting light valve 120. Light from the three sub-pixels 105, 110, or 115 is combined to produce a pixel in a display. The electro-wetting light valve 120 includes a substrate 125, an electrode 130, a hydrophobic insulator 135, a tinted oil layer 140, a hydrophilic grid 145, and a water layer 150. Surface tension relationships between the hydrophobic insulator 135, the tinted oil layer 140, and the water layer 150 cause the oil layer 140 to naturally form a film between the water layer 150 and the hydrophobic insulator 135. The hydrophilic grid 145 also attracts the water layer 150 sufficiently to laterally confine the oil layer 140. By applying a voltage to the electrode 130, however, the water layer 150 can overcome the natural tendency of the oil layer 140 to form a film and displace the oil layer 140. Different amounts of voltage cause different degrees of displacement.

Each oil layer 140 is dyed with a colorant. When no voltage is applied, the oil layer 140 forms a continuous film that absorbs light according to the colorant in the oil layer 140. The pixel-generating structure 100 can be part of a backlit or a reflective display. By applying a voltage, the oil layer 140 is displaced, which allows for light transmission. The pixel-generating structure 100 includes a YMC array 155 and a MCY array 160 on either side of the water layer 150 and a CYM fixed color-filter array 165. Each individual electro-wetting light valve 120 is independently controlled by a corresponding electrode 130, and the interaction of the hydrophilic grid and the water layer 150 forms a buffer between the various electro-wetting light valves 120.

The first sub-pixel 105 includes a yellow oil electro-wetting light valve 120, a magenta electro-wetting light valve 120, and a solid cyan filter 170. The second sub-pixel 110 includes a magenta oil electro-wetting light valve 120, a cyan electro-wetting light valve 120, and a solid yellow filter 175. The third sub-pixel 115 includes a cyan oil electro-wetting light valve 120, a yellow electro-wetting light valve 120, and a solid magenta filter 180. By adjusting the various electro-wetting light valves 120, each sub-pixel 105, 110, and 115 can approach producing two-thirds of the visible spectrum. In the illustrated example, the first sub-pixel 105 approximates black (i.e., by blocking essentially all wavelengths of visible light), the second sub-pixel 110 produces a green color (i.e., by displacing the magenta oil film and combining the cyan oil film and the yellow fixed filter), and the third sub-pixel 115 produces a magenta color (i.e., by displacing the cyan and yellow oil films and using only the magenta fixed filter). A full color display, however, requires that each pixel include multiple individual sub-pixels 105, 110, and 115.

Figure 2:
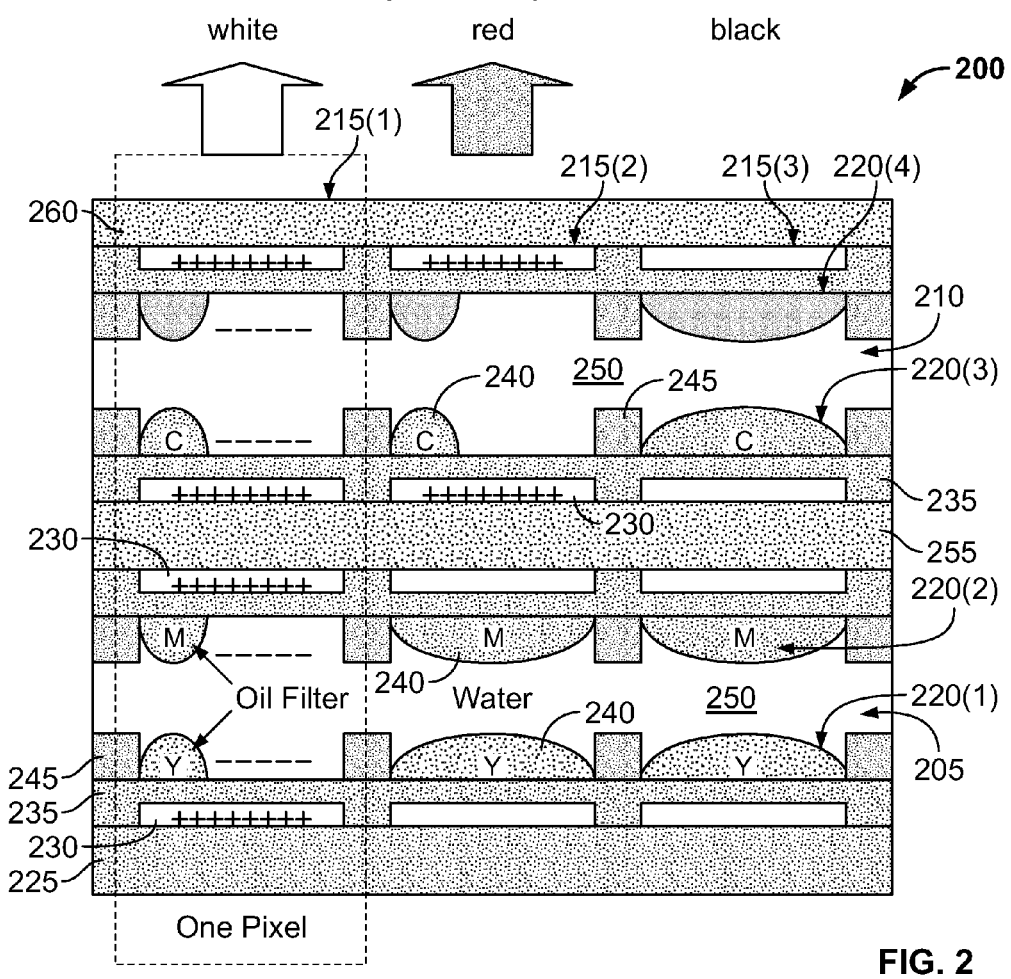
FIG. 2 is an illustrative diagram of a pixel-generating structure for producing an essentially full range of the visible spectrum.

FIG. 2 is an illustrative diagram of a pixel-generating structure 200 for producing an essentially full range of the visible spectrum. The pixel-generating structure 200 includes two adjacent, back-to-back electro-wetting structures 205 and 210. Instead of using multiple sub-pixels to create a pixel, each pixel is created by a single column, sequence, or series of electro-wetting light valves 220. Each electro-wetting light valve 220 operates as an adjustable filter. Although the pixel-generating structure 200 is depicted in a two-dimensional, cross-sectional side view, each electro-wetting light valve includes a surface area (e.g., rectangular, square, oval, or circular) that is viewable from the top side of the illustrated view. As an alternative to an electro-wetting light valve 220, other adjustable light absorbing filters can also be used. Each pixel-generating element 215 includes a yellow-tinted electro-wetting light valve 220(1), a magenta-tinted electro-wetting light valve 220(2), a cyan-tinted electro-wetting light valve 220(3), and a black electro-wetting light valve 220(4). Each electro-wetting light valve 220 adjustably absorbs light and/or interferes with passage of certain wavelengths of light.

The black electro-wetting light valve 220(4) provides a more reliable absorption of all wavelengths of light, such as in cases where the yellow, magenta, and cyan filters 220 do not cover the entire spectrum (e.g., they let some small ranges of wavelengths through). The black electro-wetting light valve 220(4) can also be used for grayscale image representations. In some implementations, grayscale image representations can be produced using the other electro-wetting light valves 220(1), 220(2), and 220(3) along with the black electro-wetting light valve 220(4) to reduce the granularity that can result from a high contrast between black and white components of a grayscale image. In addition, in some implementations, the black electro-wetting light valve 220(4) can be omitted without materially affecting the ability to achieve substantially black pixel representations (e.g., if the yellow, magenta, and cyan filters 220 allow no more than an insignificant amount of light wavelengths to pass).

The pixel-generating structure 200 includes a base substrate 225, electrodes 230, hydrophobic insulators 235, multiple tinted oil layers 240, hydrophilic grids 245, water layers 250, an intermediate substrate 255, and a front substrate 260. Because the illustrated view is a cross-sectional side view, only two sides of the each hydrophilic grid 245 are depicted. The hydrophilic grid 245 includes an array of openings, each of which corresponds to a pixel and each of which provides a lateral enclosure for the corresponding oil layer 240.

In general, the base substrate 225 serves as a light source or a light source is located behind the base substrate 225. For example, the pixel-generating structure 200 can be implemented as part of a transmissive display, in which the base substrate 225 is a backlight or is a transparent layer (e.g., glass) in front of a backlight. The backlight can be implemented using any type of backlighting mechanism, such as a light emitting diode (LED) array, a fluorescent lamp (e.g., a cold cathode fluorescent lamp (CCFL)) used as side lighting for a prism that equally distributes across an entire display screen, or other types of backlighting. Backlighting can independently illuminate each pixel-generating element 215 or collectively illuminate an array of pixel-generating elements 215. Alternatively, the pixel-generating structure 200 can be implemented as part of a reflective display, in which the base substrate 225 is a reflective layer. In the case of a reflective display, ambient light (e.g., sunlight or artificial lighting), which enters the pixel-generating structure 200 through the front substrate 260, and reflected light, which is a reflection of the ambient light from the reflective base substrate 225, can be collectively or individually considered to be the light source. The pixel-generating structure 200 can also be used with other types of displays, such as transflective (i.e., capable of both transmissive and reflective operations) and emissive displays.

Each electro-wetting light valve 220 has an associated electrode 230. By applying a voltage to the electrode 230, the oil layer 240 is displaced due to an attraction that results from a voltage differential between the water layer 250 and the electrode 230. By selectively controlling the amount of voltage applied to the electrode 230, the degree of displacement can be selectively adjusted to filter varying amounts of certain wavelengths of light. These adjustments can range from applying a small voltage that reduces a thickness of the oil layer 240 to applying a large voltage that causes the oil layer, for a particular electro-wetting light valve 220, to be displaced from at least a majority of the surface area of the hydrophobic insulator 235. In some implementations, reducing the thickness of the oil layer 240 may allow a small amount of the light wavelengths normally filtered by the tinted oil layer 240 to pass through the portion of the oil layer 240 with the reduced thickness. As an alternative to using an oil layer, a layer of some other suitable tinted substance can be used.

The electrodes 230 are each individually controlled so it is possible to apply varying and independent voltages to each electro-wetting light filter 220. In some implementations, the electrodes may be biased so as to consistently cause the oil layer 240 to be displaced in a particular direction (e.g., to a particular side or corner of the area within one opening in the hydrophilic grid 245). The bias can be introduced by varying the thickness of the hydrophobic insulator 235 across each electro-wetting light filter 220 (i.e., causing the electrode 230 to have an increasing distance from the oil layer 240 in one or more directions). Alternatively, the bias can be introduced by using multiple electrodes 230 for each electro-wetting light filter 220. The electrodes 230 for each electro-wetting filter 220 could be activated in a particular order or according to a particular algorithm to control the manner in which the water layer 250 displaces the oil layer 240. Each electrode 230 can have a single "on" voltage or a range of possible voltages.

Typically, the light source is a white light or near white light that includes at least a substantial portion of visible light wavelengths. The tinted oil layers 240 are selected to subtractively absorb a particular subset of visible light wavelengths, such that the tinted oil layers 240, even without the black layer, collectively absorb all visible light wavelengths. In some instances, the light source may be tinted, in which case some of the visible light wavelengths are already absent. Such tinted light sources generally have a relatively uniform impact on the resulting display. For example, a bluish light source will give the entire display a more bluish appearance. Light from the light source is absorbed in varying degrees by the different electro-wetting light valves 220 depending on the amount of displacement of the tinted oil layer 240. A small amount of displacement generally allows more wavelengths of light to pass, which results in less of a contribution from a specific one of the CMYK filters. For example, in the case of a white light source, a small displacement of a yellow-tinted oil layer allows more white light to pass, which results in less of a yellow contribution to the ultimate pixel color.

The pixel-generating structure 200 can also or alternatively use adjustable light absorbing filters, other than electro-wetting light valves 220, that allow selectively and adjustably controlling passage of different wavelengths of light. In general, the adjustable light absorbing filters absorb a range of visible light wavelengths from the full spectrum of the light source. For purposes of this description, the set of light wavelengths absorbed is assumed not to be an empty set. A set of light wavelengths does not necessarily refer to a continuous range of wavelengths but can include multiple separate ranges of wavelengths. The absorption of selected wavelengths of light and in relative amounts imparts color to the pixel.

By selectively adjusting each electro-wetting light valve 220 for a particular pixel-generating element 215, a wide range of different colors can be generated. Unlike conventional displays, which add RGB colors to an effectively black background, each pixel-generating element 215 can be placed in a transparent state, in which light from the light source passes through the pixel-generating element 215 unaltered for viewing by an observer within a viewable distance from the display that includes the pixel-generating element 215. For example, in the first pixel-generating element 215(1) in FIG. 2, each of the electro-wetting light valves 220 is activated such that all of the tinted oil layers are substantially displaced. Assuming either a white backlight and/or an ambient white light for a reflective display, the filters 220 allow equal passage of all wavelengths of light, resulting in the pixel-generating element 215(1) emitting a white light (i.e. to produce a white pixel).

As another example, in the second pixel-generating element 215(2) in FIG. 2, the black and cyan-tinted light filters 220 are activated, while the magenta- and yellow-tinted light filters 220 are in an inactivated state. As a result, the pixel-generating element 215(2) emits a red-colored light (i.e., to produce a red pixel). In the third pixel-generating element 215(3), none of the light filters 220 are activated, resulting in a black pixel (i.e., no light is emitted). Although the various light filters 220 are depicted in a relatively fully activated or inactivated state, other levels of activation are possible, which allows each pixel-generating element 215 to produce any number of different colors and shades.

The bias that causes the oil layer 240 to consistently be displaced in a particular direction can be used to ensure that all of the oil layers 240 in a particular pixel-generating element 215 are displaced in the same direction. Otherwise, undesirable tinting of light may occur if, for example, the magenta-tinted oil layer 240(2) is displaced in a different direction than the other three oil layers 240. Such a situation would result a magenta tint to the light. In addition, the black oil layer 240 can act as a mask to prevent undesired bleeding from other tinted oil layers 240. In other words, a mask can be used to prevent or limit unwanted tinting of emitted light. In some implementations, a solid mask can be used. Each column of openings in the hydrophilic grids 245 forms a light conduit, through which transmitted light, ambient light, and/or reflected light can pass. The light conduit can also be considered to the column of openings minus the current area or the minimum area covered by the adjustable black filter 220. Light can either pass through a transparent light conduit or can be dynamically tinted based on a state of one or more of the tinted oil layers 240.

Each pixel-generating element 215 is generally capable of producing light that ranges from white to black through at least a substantial portion of the visible spectrum. All or substantially all of the viewable pixels in a display area (e.g., a display screen or a continuous area within the display screen) of a display device can be generated using substantially identical pixel-generating elements 215. This design enables a display to have a relatively higher resolution than designs in which each pixel includes multiple sub-pixels because, instead of having three adjacent sets of electro-wetting light valves 220 to produce a full range of colors, each set (e.g., column) of adjustable light absorbing filters can produce a full range of colors.

Another feature of the pixel-generating structure 200 illustrated in FIG. 2 is that the technique of producing colors more closely matches common printing techniques. Typical printers (e.g., photo printers) use overlapping layers of cyan, magenta, yellow, and black to subtractively produce a full range of colors. To print on such printers, images and colors displayed on conventional RGB monitors need to be converted into a CMYK model to represent the colors. Such conversions can be relatively complex because each different color and shade has unique conversion factors that do not follow a straightforward conversion algorithm. The pixel-generating structure 200 provides a subtractive display with an overlapping sequence of color filters that more closely corresponds to common printing devices. As a result, color shifts, for example, can be more reliably reproduced between the display and the printer (e.g., a color shift from 20% C, 30% M, 40% Y, and 10% K to 20% C, 20% M, 30% Y, and 10% K can be handled in the same manner on a printer and a display), although actual representations of color can vary based on variations in the color of inks and/or the whiteness of the background or lighting.

Another feature of the pixel-generating structure 200 is that greater luminance can be achieved than in a structure in which each pixel is composed of colored sub-pixels. Instead of producing white light by combining red, green, and blue or cyan, magenta, and yellow colors, which provides a low luminance display, white light is produced using a white light source and a transparent set of filters, which provides a substantially higher luminance of a display panel. Colors are produced dynamically without using fixed filters that alter the color of light emitted from a light source and/or adjustable light filters but by using adjustable filters that can be adjusted between a transparent state and a state in which they impart color. Furthermore, because each pixel does not include sub-pixels, there is no phase shift between different sub-pixel colors due to the slight offset between the different colored sub-pixels.

Figure 3:
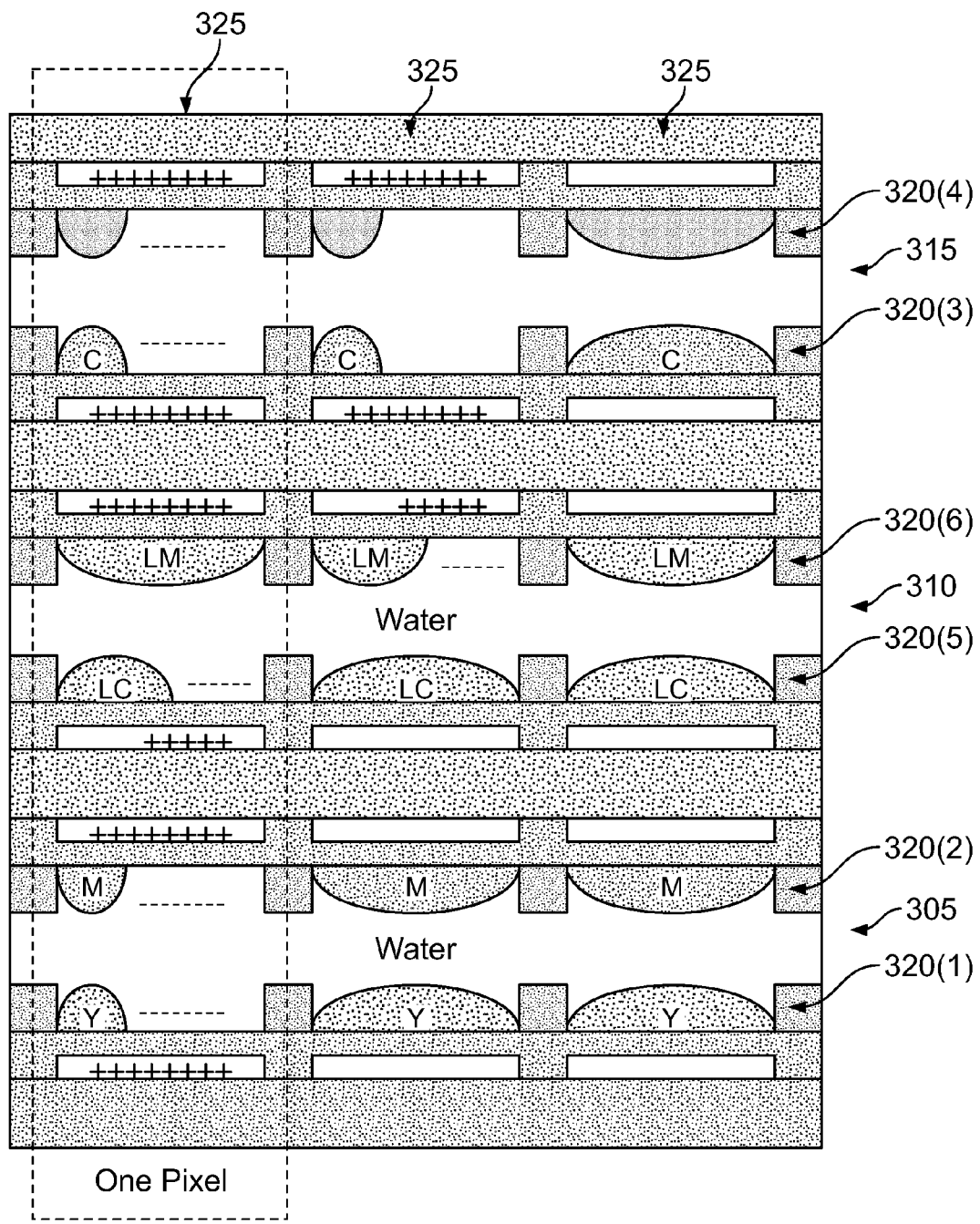
FIG. 3 is an illustrative diagram of an alternative pixel-generating structure for producing an essentially full range of the visible spectrum.

FIG. 3 is an illustrative diagram of an alternative pixel-generating structure 300 for producing an essentially full range of the visible spectrum. The pixel-generating structure 300 includes three adjacent, back-to-back electro-wetting structures 305, 310, and 315. Each pixel is created by a single series of adjustable light absorbing filters 320. Similar to the pixel-generating elements 215 of FIG. 2, each pixel-generating element 325 includes a yellow-tinted adjustable light absorbing filter 320(1), a magenta-tinted adjustable light-absorbing filter 320(2), a cyan-tinted adjustable light-absorbing filter 320(3), and a black adjustable light-absorbing filter 320(4). In addition, an intermediate electro-wetting structure 310 includes a light cyan-tinted adjustable light absorbing filter 320(5) and a light magenta-tinted adjustable light-absorbing filter 320(6). These additional lighter colored filters can be used to produce a higher dynamic range display.

Use of the light cyan-tinted adjustable light absorbing filter 320(5) and a light magenta-tinted adjustable light-absorbing filter 320(6) enables greater number of shades to be represented. If an amount of each color is driven by an eight-bit scheme, 255 shades of grayscale can be produced. By using light and dark tinted filters of certain colors (e.g., cyan and magenta), a much larger number of shades can be produced. In effect, the dynamic range of such colors is extended through the use of two channels. This feature can help avoid the appearance of banding on a display due to a limited number of levels available for a particular colorant.

In some implementations, colors other than cyan, magenta, yellow, and black can be used to tint the oil layers. Other numbers of sequential light absorbing filters can also be used. In addition or instead of using light colored filters, additional colors, such as orange or green, can be used to produce a display with a larger gamut, which is the range of colors that can be produced by a display. In some implementations, the black filter can be replaced by another color to expand the color gamut.

Figure 4:
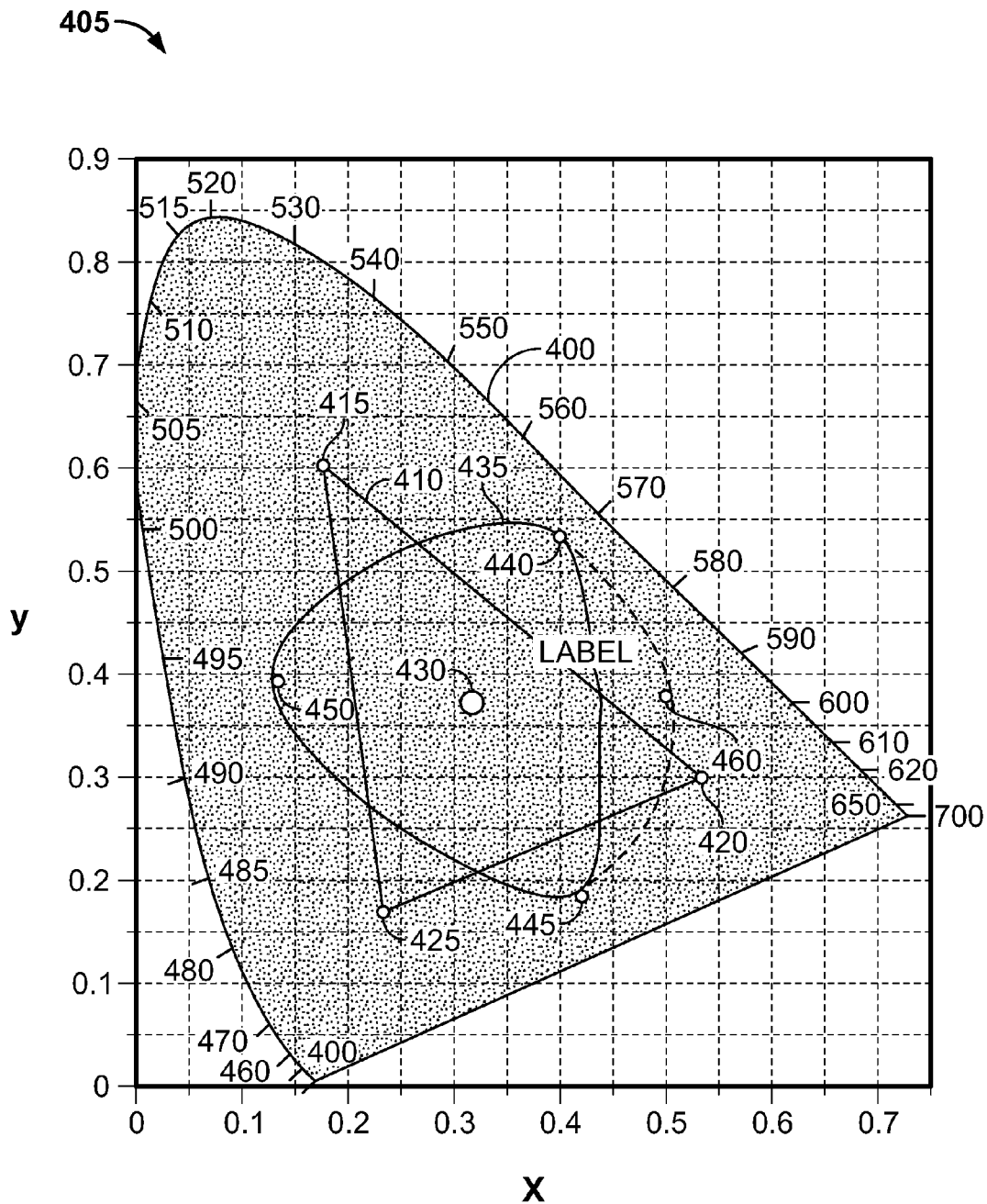
FIG. 4 is a chromaticity diagram on which a color gamut for a display or printing device can be represented.

FIG. 4 is a chromaticity diagram 400 on which a color gamut for a display or printing device can be represented. The chromaticity diagram 400 represents the entire range of visible light mapped to an x-y coordinate domain 405. The outside, curved boundary of the chromaticity diagram 400 corresponds to the wavelengths of light that can be perceived by the human eye (i.e. from about four hundred to seven hundred nanometers). Chromaticity values (i.e., where a color representation falls on the chromaticity diagram 400) depend, however, both on wavelength and saturation. In general, a display or printing device can effectively represent substantially any color without the need for a color gamut that approaches the edges of the chromaticity diagram 400 because a full range of colors can be substantially represented without the need to reproduce fully saturated colors. The chromaticity diagram 400 does not represent luminance, which can be represented by a Y component perpendicular to the depicted two-dimensional chromaticity diagram 400, with increasing Y values representing increased luminance and decreasing Y values approaching black.

Additive color mixtures of two or more colors, such as those produced by an RGB monitor, can be represented on the chromaticity diagram 400 as a point between the points corresponding to the two or more added colors. As a result, a color gamut 410 of an additive RGB display is defined by a triangle with vertices 415, 420, and 425 at the colors produced by the red, green, and blue sub-pixel sources. All colors producible by the RGB display fall within the color gamut triangle 410 depending upon the relative contributions of the red, green, and blue vertices 415, 420, and 425. Additive mixtures of red, green, and blue can be used to produce white light 430. The color gamut 410 and thus the range of colors that can be produced by an additive display depend on the hue of the red, green, and blue light sources.

Subtractive color mixtures, such as those produced by a CMYK printer or display device, can also be represented on the chromaticity diagram 400 but have a different shape. A color gamut 435 of a subtractive display, such as that described above, includes vertices 440, 445, and 450 that correspond to the cyan, magenta, and yellow colors. As mentioned above, black can be represented in a third dimension perpendicular to the illustrated chromaticity diagram 400. Instead of having straight sides, as with a color gamut 410 of an additive display, the color gamut of a subtractive display 435 has curved sides. Without any contribution from the CMYK filters, white light is emitted (assuming a white light source). Contributions from the CMY filters can be used to produce essentially any color and essentially any level of grayscale within the color gamut 435, while contributions from the K filter can be used to produce any level of grayscale, although the number of levels depends on the interval size for incrementing contributions of each filter. Additional levels can be produced by using both dark and light hues (e.g., dark and light tinted cyan filters) to filter light. The subtractive color gamut 435 and thus the range of colors that can be produced by a subtractive display or printer depend on the light source and/or reflecting surface and the color of the tinted filters or inks.

An expanded color gamut 455 can be produced in a subtractive display by including additional color filters outside of the CMYK color gamut 435. For example, by adding an orange color filter, the color range of a subtractive color mixture can be extended to produce richer orange and brown colors. The orange color filter results in a new vertex 460 corresponding to the orange color. Additional color filters, such as green, can also be added to further expand the color gamut 455.

Figure 5:
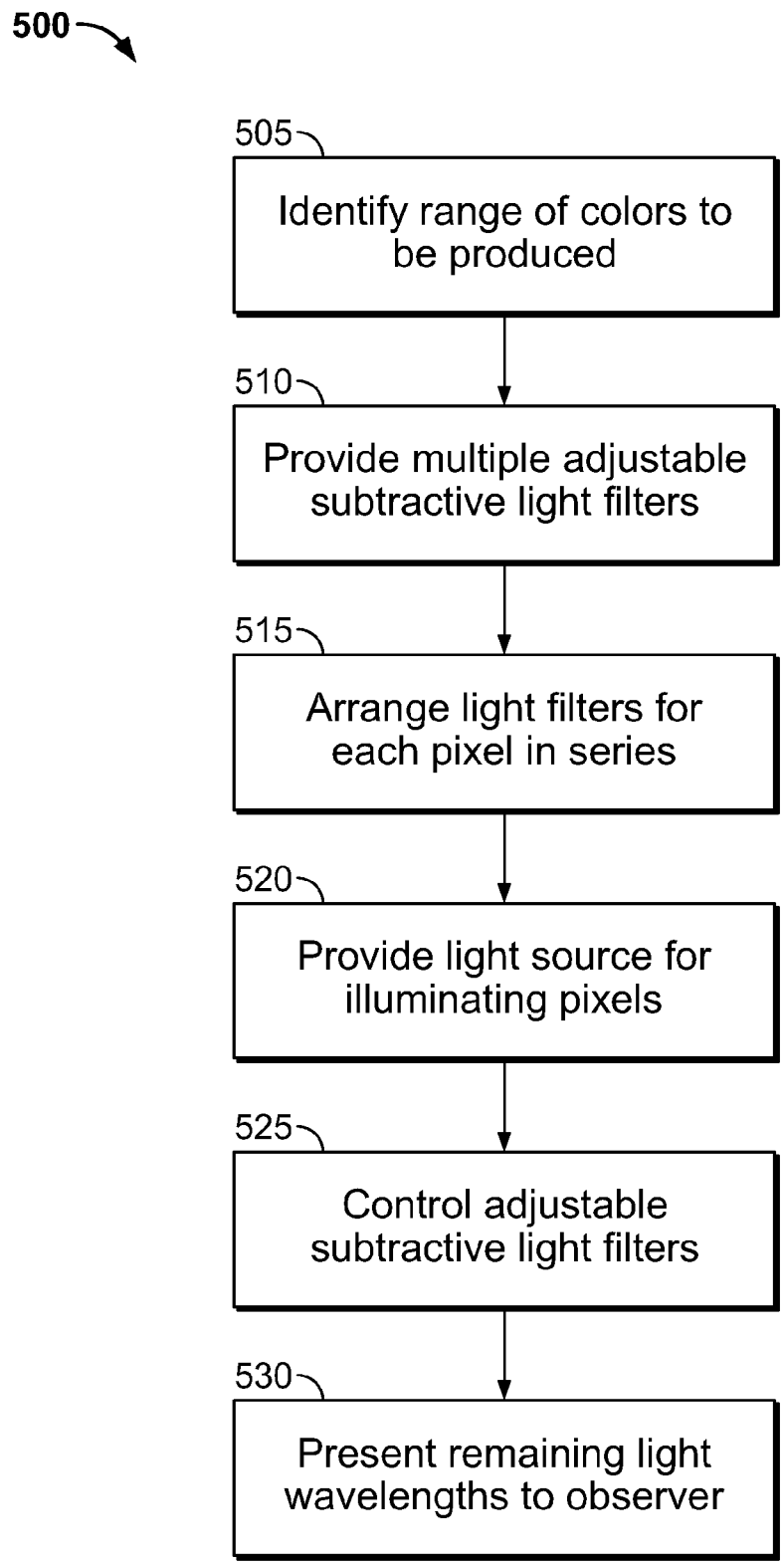
FIG. 5 is a flow diagram of a process for producing viewable information on a display.

FIG. 5 is a flow diagram of a process 500 for producing viewable information on a display. The viewable information can be any type of image, text, color, or black-and-white representation. A range of colors to be produced by a subtractive display device is identified (505). The range of colors can be identified by selecting three or more filtering colors, rather than explicitly defining a range of colors to be produced. The three or more filtering colors will naturally correspond to a particular color gamut, which can be determined empirically and/or based on an algorithm. Identifying the range of colors can also or alternatively include determining a range of colors that will be produced by a particular set of filtering colors.

Three or more adjustable subtractive light filters are provided (510) for each pixel element to be included in a display. Each pixel element produces a single pixel on the display, which typically will include thousands of pixels. The adjustable subtractive light filters are adapted to subtract or absorb a different range of visible light wavelengths, although in some cases some adjustable subtractive light filters are adapted to subtract the same range of visible light wavelengths but at a different intensity (e.g., in cases of light and dark tinted filters). The range of wavelengths can be continuous or segmented into non-continuous sub-ranges.

The adjustable subtractive light filters for each pixel are arranged (515) in series. The serial arrangement enables each of the adjustable subtractive light filters to successively absorb additional wavelengths of light, such that each filter can operate on the same shaft of light. The adjustability of the light filters allows the light filters to filter any selected amount of light wavelengths by, for example, decreasing the thickness or coverage of a tinted filter fluid. The light filters are also adjustable between a maximum amount of filtering and a relatively or effectively transparent state, in which the light filter allows incident light wavelengths to pass without alteration.

A light source is provided (520) for illuminating the pixels in the display. A single light source can illuminate all of the pixels, or multiple light sources can be used. The light source can include a backlight for producing a transmissive display, an ambient light for a transmissive and/or reflective display, and/or a reflective layer for reflecting ambient light. Typically, the light source produces primarily white light.

The adjustable subtractive light filters are controlled (525) to enable each pixel element to selectively produce substantially any color within the identified range of colors. Colors are produced by each pixel element by selectively making subtractive adjustments to light from the light source. The subtractive adjustments are made serially, such that one adjustable subtractive light filter subtracts some light wavelengths, and the resulting set of light wavelengths are further filtered by another adjustable subtractive light filter. Control of the adjustable subtractive light filter can be performed by adjusting a voltage applied to an electrode, which operates to produce a corresponding displacement of a tinted oil layer. Control can be implemented by a computer operating according to a software algorithm, such that the computer causes application of selected voltages to each adjustable light filter of each pixel element. The voltages can be selected in accordance with the software algorithm based on the precise color to be produced. The adjustable light filters can be dynamically controlled to enable each pixel to rapidly change between different colors and different luminance levels. Color changes are produced by selectively filtering more or less amounts of certain light wavelengths, including allowing a substantially transparent passage of light.

The light wavelengths that remain after passing through the series of adjustable subtractive light filters (i.e., the light wavelengths that are not absorbed) are presented (530) for viewing by an observer. The light wavelengths are presented without substantially altering the light wavelengths emitted by the series of adjustable subtractive light filters, such as would occur by passing the emitted light wavelengths through a solid filter. As a result, each pixel element can selectively present a substantially white light corresponding to the source light (e.g., if all adjustable light filters are set to a transparent state), a substantially black color by filtering substantially all light wavelengths, and light of substantially any other color.

Various implementations of the control techniques and algorithms described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made. The logic flow depicted in FIG. 5 does not require the particular order shown, or sequential order, to achieve desirable results. For example, identifying (505) a range of colors can be performed at many different places within the overall process. In certain implementations, multitasking and parallel operations may be preferable. In addition, implementations can include structures other than those described. Accordingly, other implementations are within the scope of the following claims.

What is claimed is:

1. A display comprising:
a plurality of pixel-generating structures, each pixel-generating structure including:
a light conduit adapted to allow light from a light source to pass at least from a first side to a second side of a series of controllable filtering elements;
the series of controllable filtering elements comprising:
a first adjustable light absorbing filter adapted for selective adjustment to absorb a first set of visible light wavelengths from light passing through the light conduit; and
a second adjustable light absorbing filter adapted for selective adjustment to absorb a second set of visible light wavelengths from light passing through the first adjustable light absorbing filter, the second set of visible light wavelengths including at least some wavelengths that differ from the first set of visible light wavelengths, each of the first adjustable light absorbing filter and the second adjustable light absorbing filter adjustable to a substantially transparent state, and the pixel-generating element adapted to generate a viewable pixel having a color adjustable at least between substantially a color of the light source and a color corresponding to the light source as modified by at least one of the first adjustable light absorbing filter or the second adjustable light absorbing filter.

2. The display of claim 1 wherein each pixel-generating structure further comprises at least one additional adjustable light absorbing filter adapted for selective adjustment to absorb a third set of visible light wavelengths from light passing through the first adjustable light absorbing filter and the second adjustable light absorbing filter, each pixel-generating structure adapted to produce a substantial portion of a visible spectrum.

3. The display of claim 1 wherein at least one of the first adjustable light absorbing filter and the second adjustable light absorbing filter comprises a filter adapted to selectively absorb substantially all wavelengths of light.

4. The display of claim 3 wherein each of the plurality of pixel-generating structures is adapted to produce grayscale pixels using selective filtering by at least the first adjustable light absorbing filter and the second adjustable light absorbing filter.

5. The display of claim 1 wherein each of the plurality of pixel-generating structures is adapted to produce light having a first color corresponding to the first adjustable light absorbing filter when the first adjustable light absorbing filter is activated and the second adjustable light absorbing filter is deactivated, light having a second color corresponding to the second adjustable light absorbing filter when the second adjustable light absorbing filter is activated and the first adjustable light absorbing filter is deactivated.

6. The display of claim 1 wherein each pixel-generating element further comprises a mask adapted to prevent passage of filtered light from an adjustable light absorbing filter in a substantially transparent state.

7. The display of claim 1 wherein the first adjustable light absorbing filter and the second adjustable light absorbing filter are each adjusted by altering a distribution of a layer of light absorbing fluid.

8. The display of claim 7 wherein the layer of light absorbing fluid for the first adjustable light absorbing filter and the second adjustable light absorbing filter are biased in a same direction substantially perpendicular to a direction in which light passes through the light conduit.

9. The display of claim 1 wherein the first adjustable light absorbing filter and the second adjustable light absorbing filter each include an electro-wetting light valve.

10. The display of claim 1 comprising a reflective display wherein the light source includes an ambient lighting in the vicinity of the plurality of pixel-generating structures.

11. The display of claim 1 comprising a transmissive display wherein the light source comprises a backlight.

12. A method for producing viewable information on a display, the method comprising:
dynamically filtering light from a light source emitting light having a set of visible light wavelengths, wherein light is filtered using a series of adjustably subtractive light filters, each adjustably subtractive light filter adapted to adjustably absorb a corresponding subset of visible light wavelengths from the light source, the series of adjustably subtractive light filters adapted to selectively adjust between providing a substantially transparent passage of the set of visible light wavelengths and absorbing at least a portion of the set of visible light wavelengths; and
presenting the selectively adjusted light wavelengths for viewing by an observer.

13. The method of claim 12 further comprising dynamically filtering light using a plurality of series of adjustably subtractive light filters, wherein each series of adjustably subtractive light filters defines a color of a pixel on a display device.

14. The method of claim 13 wherein the selectively adjusted light wavelengths are presented without substantially altering the light wavelengths emitted by the series of adjustably subtractive light filters.

15. The method of claim 12 wherein an adjustably subtractive light filter in the series of adjustably subtractive light filters is adapted to absorb substantially all wavelengths of light.

16. The method of claim 12 wherein each of the adjustably subtractive light filters in the series of adjustably subtractive light filters is adapted to absorb a different subset of the set of visible light wavelengths such that a first color of light is produced when a first adjustably subtractive light filter in the series of adjustably subtractive light filters is selectively adjusted to absorb a first portion of the set of visible light wavelengths and a second adjustably subtractive light filter in the series of adjustably subtractive light filters is selectively adjusted to allow substantially transparent passage of visible light wavelengths, and a second color of light is produced when the first adjustably subtractive light filter in the series of adjustably subtractive light filters is selectively adjusted to allow substantially transparent passage of visible light wavelengths and a second adjustably subtractive light filter in the series of adjustably subtractive light filters is selectively adjusted to absorb a second portion of the set of visible light wavelengths.

17. The method of claim 16 further comprising biasing a colored fluid for each of the adjustably subtractive light filters in the series of adjustably subtractive light filters in a particular direction, such that the colored fluid for the adjustably subtractive light filters moves in the same particular direction when the adjustably subtractive light filters are selectively adjusted to provide a substantially transparent passage of the set of visible light wavelengths.

18. The method of claim 12 further comprising applying a voltage to each adjustably subtractive light filter to adjust a degree of filtering of the corresponding subset of visible light wavelengths.

19. A display comprising:
means for generating a plurality of pixels, each pixel generated using:
a conduit for allowing passage of light from a light source; and
at least two means for adjustably absorbing light, the at least two means for adjustably absorbing light arranged in series to selectively filter wavelengths of light produced by the light source, each of the means for adjustably absorbing light absorbing at least a partially different set of visible light wavelengths, wherein the at least two means for adjustably absorbing light include:
a first means for adjustably absorbing a first set of visible light wavelengths from light passing through the conduit; and
a second means for adjustably absorbing a second set of visible light wavelengths from light passing through the first means for adjustably absorbing a first set of visible light wavelengths, each of the first means for adjustably absorbing light and the second means for adjustably absorbing light being adjustable to a substantially transparent state, and the at least two means for adjustably absorbing light adapted to generate a viewable pixel having at least substantially a color of the light source, a color corresponding to the light source as modified by the first means for adjustably absorbing light, and a color corresponding to the light source as modified by the second means for adjustably absorbing light.

20. The display of claim 19 wherein the at least two means for adjustably absorbing light include at least two electro-wetting layers, each electro-wetting layer comprising a layer of tinted substance adapted to adjustably interfere with passage of a set of visible light wavelengths.

21. The display of claim 20 wherein the tinted substance for each electro-wetting layer is biased in a same particular direction when each electro-wetting layer is adjusted to generate a pixel having substantially a color of the light source.

22. The display of claim 19 wherein the at least one of the means for adjustably absorbing light is adapted for selective adjustment between generating a viewable pixel having substantially a color of the light source and blocking substantially all visible light wavelengths from passing through the means for adjustably absorbing light.

\* \* \* \* \*

UNITED STATES PATENT AND TRADEMARK OFFICE
CERTIFICATE OF CORRECTION

| | | |
|---|---|---|
| PATENT NO. | : 8,203,512 B2 | |
| APPLICATION NO. | : 12/554768 | |
| DATED | : June 19, 2012 | |
| INVENTOR(S) | : Gabriel G. Marcu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 325 days.

--This patent is subject to a terminal disclaimer.--

Signed and Sealed this
Thirteenth Day of November, 2012

David J. Kappos
*Director of the United States Patent and Trademark Office*